United States Patent [19]

Lloyd et al.

[11] 4,295,066

[45] Oct. 13, 1981

[54] ELECTROMAGNETIC ACTUATOR

[75] Inventors: C. F. Lloyd, Rexdale; Z. Leo Zalewski, Brampton; Paul C. Brendle, Mississauga, all of Canada

[73] Assignee: CTS Corporation, Elkart, Ind.

[21] Appl. No.: 111,398

[22] Filed: Jan. 11, 1980

[51] Int. Cl.[3] .............................................. H02K 33/12

[52] U.S. Cl. .......................................... 310/30; 310/35

[58] Field of Search ........................ 310/15, 23, 29, 30, 310/34, 35; 318/122, 125; 335/227, 230

[56] References Cited

U.S. PATENT DOCUMENTS

| | | | |
|---|---|---|---|
| 608,175 | 8/1898 | Casler | 310/30 |
| 720,596 | 2/1903 | Marshall | 310/30 X |
| 3,201,670 | 8/1965 | Myers | 310/30 X |
| 3,484,629 | 12/1969 | Kunz | 310/15 |
| 3,931,554 | 1/1976 | Spentzas | 318/122 |
| 4,129,187 | 12/1978 | Wengryn et al. | 310/306 |

*Primary Examiner*—Donovan F. Duggan
*Attorney, Agent, or Firm*—John A. Young; Larry J. Palguta

[57] ABSTRACT

An electromagnetic actuator comprising a housing of magnetizable material defining a stationary pole, a bobbin supported by the housing and having an interior bore, an armature comprising a permanent magnet provided with a pair of magnetic poles and movably supported by the bobbin, a pair of coils circumposing the armature and having wire end portions and means securing the wire end portions to the bobbin. The bobbin comprises a pair of bobbin sections and means connecting the bobbin sections, each bobbin section having an inner and an outer rim and supporting one of the coils between the rims. A collar section integrally connects each of the bobbin sections and comprises a keeper for securing the wire end portions and a radially extending vent bore. The collar section associates each bobbin section with coil with one of the magnetic poles, receives wire securement forces from the keeper and permits the wall thickness of each bobbin section to be minimized, thereby minimizing separation between the poles and maximizing magnetic flux constrained to pass between the poles. Energization of the coils exerts a force on the coils with respect to the armature resulting in linear motion of the armature.

10 Claims, 7 Drawing Figures

ELECTROMAGNETIC ACTUATOR

RELATED APPLICATION

This application is an improvement over commonly assigned U.S. application Ser. No. 064,388 filed Aug. 8, 1979, incorporated herein by reference.

FIELD OF THE INVENTION

The present invention relates to electromagnetic actuators and, more particularly, to an improved electromagnetic actuator having a moving permanent magnet armature, a pair of spaced stationary coils and a bobbin supporting the armature and positioning the coils about the poles of the magnet.

DESCRIPTION OF THE PRIOR ART

The prior art is replete with electromagnetic actuators having different applications and showing various constructions and coil winding securements. A solenoid-type actuator currently employed in a fuel well of an engine carburetor comprises a housing, a plunger of magnetizable material positioned to move within the housing and a spool disposed between the housing and plunger, the spool carrying a single continuous winding of current-carrying wire. When the winding is energized, a magnetic field is produced and exerts a force on the plunger, thereby causing axial acceleration of the plunger relative to the stationary winding. Since the magnetic field created by the energization of the coil and performance of the solenoid is not critically affected by separation between the housing and the plunger, the spool configuration is not a critical design consideration. A motor-type actuator comprises a housing of magnetizable material defining a stationary pole, a movable permanent magnet armature defining moving poles and generating magnetic flux through the housing and a stationary winding circumposing the magnet. Optimum motor performance is achieved by constraining the maximum magnetic flux to pass through the poles. However, since force and/or power output of the actuator is a function of and determines the number of energizable coils positioned adjacent the magnetic poles and is usually a fixed design requirement, a coil winding bobbin separates the stationary and moving poles of the magnet. Separation of the stationary pole from the moving pole by the winding affects the flow of flux emanating from the magnet, therefore affecting optimum motor performance and should be held to an absolute minimum. It would, therefore, be desirable to provide an actuator with a bobbin which secures the stationary winding but which does not introduce an undesirable separation between the stationary and the moving poles. Although the solenoid winding is continuous and generally circumposes the entire length of the plunger, an electromagnetic motor requires that the coils be adjacent to the poles since any coil winding disposed longitudinally between the magnetic poles does not contribute to improved performance of the magnetic circuit. Hence, it would be desirable to provide a bobbin that associates a coil opposite to each magnetic pole. Further, an actuator used in a well of an engine carburetor captures fluid medium which tends to resist movement of the armature, thereby requiring more power and causing the actuator to work harder to overcome the fluid medium resistance. It would be desirable to have a combination bobbin and housing which is compact and which permits fluid medium to vent from the actuator.

It will be understood that a bobbin having the aforementioned desirable features should be adapted for automated assembly techniques and should be economical to manufacture.

SUMMARY OF THE INVENTION

Accordingly, an object of the present invention is to provide a new and improved permanent magnet actuator having a pair of bobbin sections, a coil winding carried on each bobbin section and a collar section connecting the bobbin sections together in spaced-apart relation.

Another object of the present invention is to provide an electromagnetic actuator with a bobbin having a pair of bobbin sections positioning a stationary winding in circumposing relation to each pole of a permanent magnet armature.

An additional object of the present invention is to provide an electromagnetic actuator with a combination bobbin and armature bearing member supporting a pair of spaced coils and the armature.

Yet another object of the present invention is to provide an electromagnetic actuator with a bobbin including a collar section having an outer wall, a pair of bobbin sections spaced by the collar section and having a coil supporting wall and an interior bore extending through the sections, the wall thickness of the bobbin sections being less than the wall thickness of the collar section.

Still another object of the present invention is to provide an electromagnetic actuator with a bobbin having an interior bore and a transverse radial bore communicating with the interior bore to vent fluid medium captured in the interior bore.

Still a further object of the present invention is to provide an actuator particularly adapted for automated assembly techniques to permit increased economies in the manufacture of the actuator.

Further objects and advantages of the present invention will become apparent as the following description proceeds, and the features of novelty characterizing the invention will be pointed out with particularity in the claims annexed to and forming a part of this specification.

Briefly, the present invention relates to an electromagnetic actuator comprising a housing of magnetizable material defining stationary magnetic poles, a bobbin of non-magnetizable material supported by the housing and provided with an interior bore, an armature supported in the interior bore for movement relative to the housing, the armature comprising a permanent magnet having a pair of magnetic poles and a pair of pole pieces of magnetizable material and a stationary coil carried by the bobbin and circumposing the pole pieces of the armature. The bobbin comprises a pair of bobbin sections provided with inner and outer rims and a collar section connecting the bobbin sections, each bobbin section being associated with one magnetic pole, carrying a stationary coil winding and having a wall thickness less than that of the collar section. A keeper connected to the collar section secures wire end portions to the bobbin. In a preferred embodiment of the invention, the collar section further comprises a pair of diametrically opposed bosses provided with a radial bore, each radial bore communicating with and venting fluid from the interior bore to reduce fluid resistance tending to retard movement of the armature in the bore.

For a better understanding of the present invention, reference may be had to the accompanying drawings wherein the reference numerals have been applied to like parts.

DRAWINGS

DETAILED DESCRIPTION

Figure 1:
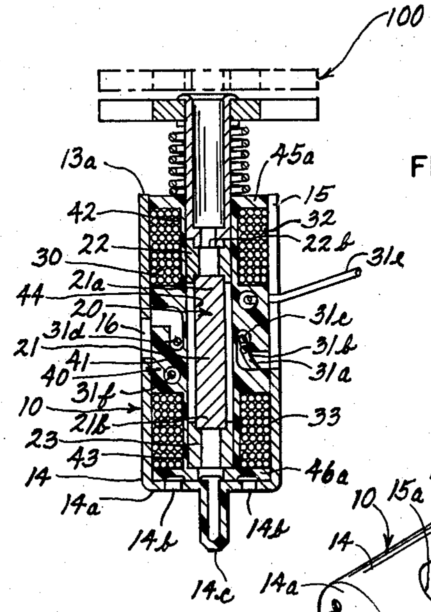
FIG. 1 is a side view in section of an electromagnetic actuator according to the present invention.
Figure 2:
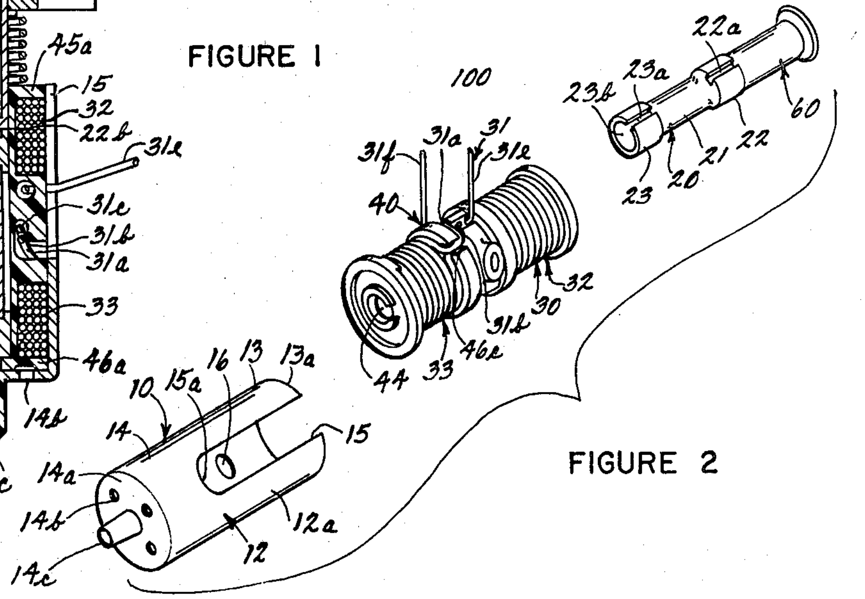
FIG. 2 is an exploded view of the electromagnetic actuator of FIG. 1.

Referring now to FIGS. 1 and 2 of the drawings, there is illustrated an electromagnetic actuator of the linear type generally indicated at 100 comprising a housing 10, a bobbin 40 having an interior bore 44 and fixedly secured to the housing, an armature 20 movably supported in the interior bore 44 and a winding 30 wound on the bobbin 40 and disposed in spaced, circumposing relationship with the armature.

The housing 10, shown best in FIGS. 1 and 2 of the drawings, comprises an elongated hollow cylinder 12 of magnetizable material having a center portion 12*a* and end portions 13, 14 and provided with an aperture 16 and an elongated notch 15. Notch 15 and aperture 16 are 180° out of phase with each other on the hollow cylinder 12. The notch 15 includes a bight portion 15*a* and extends inwardly from the end 13*a* of the cylinder 12 toward the center portion 12*a* of the cylinder. Inasmuch as the cylinder 12 is part of the magnetic circuit of the actuator 100, notch 15 reduces eddy current losses and improves overall efficiency of the actuator. The end 14*a* of the housing end portion 14 includes a pintle 14*c* and a plurality of openings 14*b*. The pintle 14*c* extends outwardly from the center of end 14*a* and provides pivotal support for the actuator in the carburetor. The openings 14*b* are disposed around the pintle in planetary fashion and allow fluid to drain from the housing when the actuator is mounted in a fluid medium.

Preferably and in accord with the present invention, the armature 20 comprises a cylindrical permanent magnet 21 and a pair of pole pieces 22, 23, the pole pieces being fixedly secured to opposite end portions 21*a*, 21*b* of the permanent magnet to define a pair of moving magnetic poles, the outer surfaces of the pole pieces being disposed closer to the housing 10 than the outer surface of the magnet 21 to constrain flow of magnetic flux emanating from the magnet 21 through the pole pieces and the housing. The pole pieces 22, 23 are each provided with an opening 22*b*, 23*b* respectively having a diameter substantially the same as the diameter of the permanent magnet 21, each pole piece being disposed in overlapping relationship with a respective end portion 21*a*, 21*b* (see FIG. 1) of the magnet 21. Further, each of the pole pieces 22, 23 is provided with an elongated slot 22*a*, 23*a* respectively to minimize eddy current losses and to provide an optimum actuator efficiency.

The stationary winding 30 comprises a pair of axially spaced coils 32, 33 of suitable magnet wire 31 wound onto the bobbin 40, each coil 32, 33 respectively being associated with and circumposing one pole piece 22, 23 of the armature 20 and each being disposed adjacent to the end portions 13, 14 of the housing 10. The pair of coils 32, 33 is wound in opposite directions if the input current to each of the coils is the same; and the winding direction is the same if the input current to each of the coils is reversed.

Figure 3:
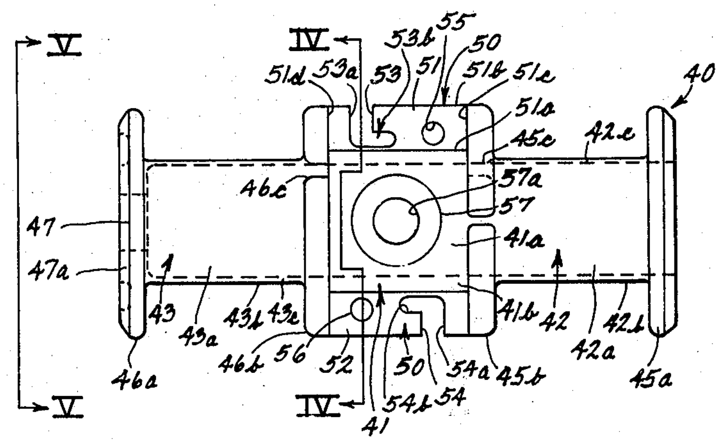
FIG. 3 is a side view of a bobbin.
Figure 4:
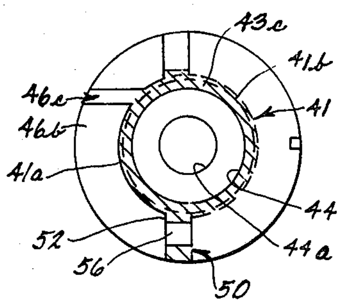
FIG. 4 is a sectional view taken along lines IV—IV of FIG. 3.
Figure 5:
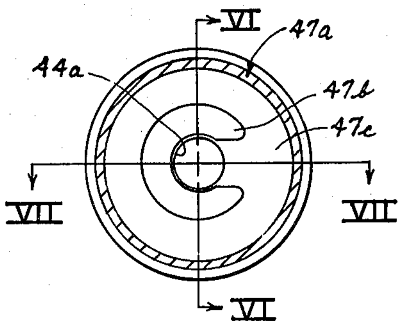
FIG. 5 is an end view of the bobbin taken along lines V—V of FIG. 3.
Figure 6:
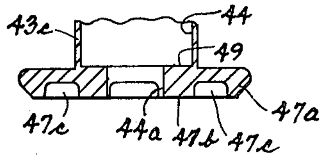
FIG. 6 is a sectional view of a rim of FIG. 5 taken along lines VI—VI of FIG. 5.
Figure 7:
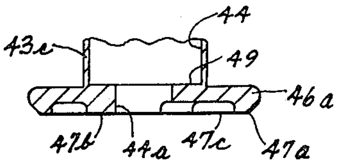
FIG. 7 is a sectional view of the rim taken along lines VII—VII of FIG. 5.

Referring now to FIGS. 1 and 3, the bobbin 40 supporting the winding 30 is molded of a non-magnetizable material, such as ryton (i.e., polyphenylene sulphide) and comprises a pair of axially aligned bobbin sections 42, 43 connected together and fixedly secured within the housing cylinder 12, the bobbin sections 42, 43 receiving the coils 32, 33 respectively. Preferably and in accord with the present invention, the bobbin 40 is molded into one piece and comprises the bobbin sections 42, 43 and a center collar section 41 having an outer surface 41*a*. Each bobbin section 42, 43 respectively comprises a cylindrical member 42*a*, 43*a* having an outer surface 42*b*, 43*b* and a pair of spaced rims 45*a*, 45*b* and 46*a*, 46*b* respectively extending from the cylindrical member 42*a*, 43*a*. Relative to the collar section 41, rims 45*a*, 46*a* and 45*b*, 46*b* are designated as outer and inner rims respectively. Opposite ends of the collar sections 41, adjacent to the inner rims 45*b*, 46*b*, integrally connect the bobbin sections 42, 43 to the collar. As shown best in FIGS. 3 and 4, an elongated slot 45*c*, 46*c* is provided in the inner rim 45*b*, 46*b* respectively and receives a wire end portion of each coil, each slot extending from the periphery of the respective rim and inwardly toward the cylindrical member 42*a*, 43*a* respectively. Both slots are disposed in substantially the same plane.

Referring now to FIGS. 4–7, and FIG. 4 in particular, a centrally disposed interior bore 44 of generally uniform diameter axially extends through the interior of each section 41, 42 and 43 of the bobbin 40 and supports the armature 20 for movement in the housing. A second bore 44*a*, axially aligned and concentric with the bore 44, extends through the outer rim 46*a* of the bobbin section 43 and permits fluid medium to drain from the interior bore of the housing. Inner surface 49 of the outer rim 46*a* functions as a stop and limits inward movement of the armature 20 (see FIGS. 6 and 7). An end portion 47 extends from the outer rim 46*a*, is adjacent tne end 14*a* of the cylinder 12 and locates the bobbin 40 relative to the housing cylinder. The end portion 47 comprises a circular skirt 47*a* coextensive with the periphery of the outer rim 46*a* and a C-shaped shoulder 47*b*, the skirt and shoulder being spaced apart, concentric with each other and with the bore 44*a* and cooperating to define a recess 47*c* adjacent to the openings 14*b* of the housing 10 to permit fuel to drain from the interior bore of the bobbin when the actuator is mounted in the carburetor.

As best shown in FIG. 3 of the drawings, the collar section 41 comprises a pair of wire keepers 50 that secure wire end portions from the coils 32, 33 to the bobbin 40 and a pair of transverse bosses 57 each provided with radial bore 57*a* that assists in venting fluid medium from the housing and in winding the coils to the bobbin. Preferably and in accord with the present invention, the wire keepers comprise a pair of planar webs 51, 52 having an L-shaped notch 53, 54 and a wire-receiving aperture 55, 56. Inasmuch as each web is similar, only web 51 will be described. The web 51 is longitudinally directed and laterally extends from the outer surface 41*a* of the collar and comprises a pair of spaced longitudinal edges 51*a*, 51*b* and spaced lateral edges 51*c*, 51*d* respectively, the longitudinal edges being connected to and spaced from the collar section 41 respectively and the lateral edges being integrally connected to the inner rims 45*b*, 46*b* respectively. The L-shaped notch 53 comprises a body 53*a* and a foot 53*b*, the body being adjacent to the inner rim 46*b* and extending inwardly from the free edge 51*b* to the foot 53*b*, the foot being directed from rim 46*b* to 45*b* in generally parallel spaced relation to the outer surface 41*a* of the collar section 41. Similarly, the body 54*a* of the notch 54 is adjacent to the inner rim 45*b* and the foot 54*b* extends from the body 54*a* towards inner rim 46*b*. The wire-receiving apertures 55, 56 are disposed between the notch body 53*a*, 54*a* and the inner rims 45*b*, 46*b* respectively.

The bosses 57 extend from diametrically opposite positions on the collar section 41. The radial bore 57*a* extends through the boss 57 and communicates with the interior bore 44 of the bobbin 40, one radial bore being aligned with the notch 15 and the other with the aperture 16 of the housing 10. Communication with the interior bore 44 of the bobbin by the radial bore provides a vent for releasing fluid medium and reducing resistance of the fluid medium in the interior bore which, when the armature is reciprocating, tends to retard movement of the armature in the bore 44. The radial bores 57*a* in the bosses 57 also provide a receiver for holding a (not shown) winding pin used during winding of the coil.

Preferably and in accord with the present invention and for the purpose of movably supporting the armature 20 within the housing 10, the interior bore 44 of the bobbin 40 defines a bearing surface for supporting the pole pieces 22, 23 of the armature 20. The diameter of the bore 44 of the bobbin 40 is slightly larger than the diameter of the pole pieces 22, 23 to facilitate axial movement and, when necessary, relative rotation between the armature and the frame.

To constrain the maximum magnetic flux emanating from the magnet 21 to flow through the pole pieces 22, 23 and the stationary poles of the housing 10, separation therebetween should be minimal. In order that the pole pieces supported on the magnet be brought as close as possible to the stationary poles of the housing 10 without sacrifice in the amount of coil wound adjacent to the associated pole piece, a wall thickness 42*c* (FIG. 3), 43*c* (FIG. 7) of each respective bobbin section associated with a respective magnetic pole, measured as the distance between the interior bore 44 and the outer and coil supporting surface 42*b*, 43*b* of each bobbin section respectively, is minimum and made as thin as possible. A wall thickness 41*b* of the collar section 41 is greater than the wall thickness of the bobbin sections and provides a strong support for connecting the bobbin sections together, receiving wire ends to be secured and withstanding coil winding forces.

A method of winding the coils 32, 33 to the bobbin sections 42, 43 includes: inserting a (not shown) spindle into the bores 44, 44*a* of the bobbin, inserting the (not shown) coil winding pin through the radial bores 57*a* of the bobbin, securing an end portion 31*a* of wire 31 about and to the winding pin adjacent to a boss 57 directing wire 31 through the elongated slot 46*c* of the inner rim 46*b*, rotating the bobbin by the spindle (in a direction out from the paper) until the coil 32 is formed in a window between the inner and outer rims 46*a*, 46*b* respectively and a wire end portion 31*b* provided, directing the wire end portion 31*b* through the elongated slot 46*c* and to the collar section 41, rotating the bobbin by the spindle 40°-50° (in a direction out of the paper) to provide a wire end portion 31*c*, a continuation of wire 31 and wire end portion 31*b*, inserting the wire end portion 31*c* into and through the L-shaped notch 53 of the web 51, directing the wire end portion 31*c* through the elongated slot 45*c*, rotating the bobbin by the spindle (in a direction into the paper) until the coil 33 is formed in a window between the inner and outer rims 45*a*, 45*b* and a wire end portion 31*d* provided, directing wire end portion 31*d* back through the elongated notch 45*c* and to the center collar section 41 and securing the end portion 31*d* to the winding pin, thereby providing a wound bobbin assembly having first 31*b*, 31*c* and second wire end portions 31*a*, 31*d* extending from each of the coils 33, 32 respectively and disposed between the inner rims, the first wire end portion of each of the coils being electrically interconnected. The second wire ends 31*a*, 31*d* are removed from the winding pin and the pin is removed from the radial bore 57*a* of the bobbin, the second wire ends being ready for electrical termination. A (not shown) electrical connector having a pair of leads 31*e*, 31*f* is electrically connected to the second wire ends 31*a*, 31*d*. The lead 31*e* is directed through aperture 55 of the web 51, through foot 53*b* of the L-shaped notch 53 and electrically terminated with the wire end 31*a*. The lead 31*f* is directed through aperture 56 of the web 52, through the foot 54*b* of the L-shaped notch 54 and electrically terminated with the wire end 31*d*. Each terminated pair of wires 31*a*, 31*e* and 31*d*, 31*f* respectively is urged into the foot 53*b*, 54*b* of the respective L-shaped notch. Each of the webs 51, 52 serves to protect each electrically terminated wire end portion. The wound bobbin assembly is then fixedly secured within the housing 10, the pair of terminal wires 31*e*, 31*f* and the electrical connector extending from notch 15 of the housing 10.

The actuator of the present invention finds particular application in positioning metering jets of a gasoline engine carburetor and controlling the ratio of the air/fuel mixtures provided by the carburetor to the engine. Inasmuch as the actuator is mounted within a fuel well of the carburetor, fuel is either captured within or sloshes into the housing interior during carburetor movement and tends to resist or retard movement of the armature, thereby interfering with actuator performance. The apertures 14*b* in the housing end 14*a* in combination with the bobbin bore 44*a* and the aperture 16 and notch 15 in the housing 12, in alignment with the radial bores 57*a* in the bobbin collar section 41, communicate with and allow fluid medium to be vented from the interior bore 44 of the bobbin 40. Fuel resistance retarding back-and-forth movement of the armature 20 is reduced by venting the fuel outwardly of the bobbin interior during actuator operation.

OPERATION

In operation, various parameters, in the case of the device being utilized for controlling fuel-air mixture ratios, are communicated to the winding 30 including the axially spaced coils 32, 33 and the extent of energization in the electric circuit of the pair of coils 32, 33 produces a displacement of the armature 20 which in turn is communicated through an actuator to effect a disposal of a valve (not shown) and other member effective for controlling the cross section of a venturi (also not shown). Since the device is disposed within a carburetor and is immersed within a liquid fuel, it is an important feature of the present invention that the armature 20 which is displaceable by development of current within the coil, be unaffected by movement or impedance from the liquid fuel contained within the carburetor. This is obviated by displacement of the fluid through longitudinal bore 44 contained within the bobbin 40, and further by means of the provision for fluid displacement between the hollow cylinder 12 interior and the bore 44, together with the radial openings 57*a*, bore 44*a*, and openings 14*b* which permit fluid to be vented from the housing and the bobbin thereby permitting relatively free longitudinal movement of the armature 20. Thus, the armature 20 is responsive only to the electrical signals from the operating parameters controlling the extent of electrical energization of the coils on the bobbin. In this way, it is possible to control precisely a fuel-air ratio in accordance with the present invention, and to dispose the device within a carburetor or the like without introducing extraneous and erroneous influences on the armature which would otherwise affect its precise controlling functions relative to the actuator, and without substantial affect by the fluid which in turn it controls, as a carburetion function.

CONCLUSION

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the following claims as equivalent of the invention.

What is claimed as new and desired to be secured by Letters Patent of the United States is:

1. In an electromagnetic actuator, the combination comprising a housing of magnetizable material, a bobbin supported by the housing and provided with an interior bore, an armature supported in the interior bore for movement relative to the housing, the armature being provided with a magnet and a pair of spaced magnetic poles, the bobbin comprising a pair of bobbin sections, an inner rim and an outer rim secured to each of the bobbin sections, and means connecting the bobbin sections, the interior bore extending through the sections and the means connecting the sections, a radial bore being provided in the means connecting the sections and communicating with the interior bore to reduce resistance retarding movement of the armature, a coil carried by each of the bobbin sections and circumposing the armature, the coils being associated with the magnet poles, a first and a second wire end portion extending from each of the coils and disposed between the inner rims, the first wire end portion of each of the coils being electrically interconnected, and means securing the wire end portions to the bobbin.

2. The actuator of claim 1, wherein the means connecting the bobbin sections comprises a collar section disposed adjacent the inner rim of each of the bobbin sections.

3. The actuator of claim 2, wherein the collar section is integrally joined with each of the bobbin sections.

4. The actuator of claim 2, wherein the means securing the wire end portions to the bobbin comprises a keeper secured to the collar section and adapted to secure one of the second wire end portions to the bobbin.

5. The actuator of claim 4, wherein the keeper is plate-like and has an L-shaped wire receiving notch.

6. The actuator of claim 5, wherein the means securing the wire end portions to the bobbin further comprises a second plate-like keeper secured to the collar section and adapted to secure the other of the second wire end portions to the bobbin, the second keeper spaced from the other keeper and having an L-shaped wire receiving notch.

7. In an electromagnetic actuator, the combination comprising a housing of magnetizable material, a bobbin supported by the housing and provided with an interior bore, an armature supported in the interior bore for movement relative to the housing, the armature being provided with a magnet and a pair of spaced magnetic poles, the housing comprising side and end portions, the end portion having an opening therethrough, the bobbin comprising a pair of bobbin sections having a first outer surface, an inner rim and an outer rim secured to each of the bobbin sections, a collar section disposed between the bobbin sections and having a second outer surface and a radial bore extending between the second outer surface and the interior bore, the interior bore extending through the sections of the bobbin and communicating with the radial bore, and a first and a second wall thickness being defined by a distance measured between the interior bore and the first and second outer surfaces of the bobbin and collar sections respectively, the first wall thickness being less than the second wall thickness, a coil carried by each of the bobbin sections and circumposing the armature, the coils being associated with the magnetic poles, a first and a second wire end portion extending from each of the coils and disposed between the inner rims, the first wire end portion of each of the coils being electrically interconnected, and means securing the wire end portions to the bobbin.

8. The actuator of claim 7, wherein the bobbin is one piece.

9. The actuator of claim 7, wherein the means comprises first and second spaced apart keepers secured to the collar section, each keeper having a wire receiving notch for securing a wire end portion to the bobbin.

10. In an electromagnetic actuator, the combination comprising a housing of magnetizable material, a bobbin disposed within and supported by the housing and provided with an interior bore, an armature supported in the interior bore for movement relative to the housing, the armature being provided with a magnet and a pair of spaced magnetic poles, the housing comprising side and end portions, the end portion having openings therethrough, the bobbin comprising a collar section provided with an outer surface and a radial bore, the radial bore extending between the outer surface and the interior bore, a pair of bobbin sections connected to the collar section, the interior bore extending through the sections of the bobbin and communicating with the radial bore, an inner rim and an outer rim secured to each of the bobbin sections, and first and second spaced apart plate-like keepers secured to the collar section, each keeper having an L-shaped wire receiving notch for securing a wire end portion to the bobbin, a coil carried by each of the bobbin sections and circumposing the armature, the coils being associated with the magnetic poles, a first and a second wire end portion extending from each of the coils and disposed between the inner rims, the first wire end portion of each of the coils being electrically interconnected.

* * * * *